United States Patent
O'Dell et al.

(10) Patent No.: US 11,209,273 B2
(45) Date of Patent: Dec. 28, 2021

(54) CELESTIAL NAVIGATION SYSTEM

(71) Applicant: QINETIQ LIMITED, Farnborough (GB)

(72) Inventors: Mark Anthony O'Dell, Pershore (GB); Stephen Barry Foulkes, Fownhope (GB); Philip John Kent, Powick (GB)

(73) Assignee: QINETIQ LIMITED, Farnborough (GB)

(*) Notice: Subject to any disclaimer, the term of this patent is extended or adjusted under 35 U.S.C. 154(b) by 258 days.

(21) Appl. No.: 16/081,655

(22) PCT Filed: Mar. 15, 2017

(86) PCT No.: PCT/EP2017/056169
§ 371 (c)(1),
(2) Date: Aug. 31, 2018

(87) PCT Pub. No.: WO2017/158055
PCT Pub. Date: Sep. 21, 2017

(65) Prior Publication Data
US 2019/0086209 A1 Mar. 21, 2019

(30) Foreign Application Priority Data
Mar. 17, 2016 (GB) .................... 1604556

(51) Int. Cl.
G01C 21/02 (2006.01)
G01J 3/02 (2006.01)
(Continued)

(52) U.S. Cl.
CPC .......... *G01C 21/025* (2013.01); *G01J 3/0205* (2013.01); *G01J 3/2803* (2013.01); *G01S 3/7867* (2013.01)

(58) Field of Classification Search
CPC .... G01C 21/025; G01J 3/0205; G01J 3/2803; G01S 3/7867
See application file for complete search history.

(56) References Cited

U.S. PATENT DOCUMENTS

| 3,100,264 A | | 8/1963 | Lawrence |
| 3,393,320 A | * | 7/1968 | Arazi ...................... G01S 3/785 |
| | | | 250/549 |

(Continued)

FOREIGN PATENT DOCUMENTS

CN 104 457 760 A 3/2015

OTHER PUBLICATIONS

Jun. 22, 2017 International Search Report issued in International Patent Application No. PCT/EP2017/056169.
(Continued)

*Primary Examiner* — Behrang Badii
*Assistant Examiner* — Daniel L Greene
(74) *Attorney, Agent, or Firm* — Oliff PLC

(57) ABSTRACT

A celestial navigation system includes an optical device for receiving light from a celestial object, a spectrometer for measuring a spectrum of the light in sufficient detail to identify absorption and/or emission features, and a processor for processing the spectrum to match the spectrum, or a processed version thereof, against a set of reference spectra information in a database, a device for measuring the pointing direction of the optical device and a clock. The matching may be on a maximum likelihood basis. The system is thus able, on identification of a single star, and, using commonly available navigational almanacs, to calculate a geographical position. Celestial navigation takes place even when only one celestial object (that is also within the database) is visible, although improved accuracy may be obtained with multiple observations. Advantageously, the (Continued)

database includes stars of the K and/or M type, that have more characteristic spectral content.

18 Claims, 5 Drawing Sheets

(51) Int. Cl.
*G01J 3/28* (2006.01)
*G01S 3/786* (2006.01)

(56) References Cited

U.S. PATENT DOCUMENTS

| | | | | |
|---|---|---|---|---|
| 3,769,710 | A * | 11/1973 | Reister | G01C 21/165 33/320 |
| 4,621,329 | A | 11/1986 | Jacob | |
| 6,008,492 | A * | 12/1999 | Slater | G01J 3/02 250/334 |
| 6,049,622 | A * | 4/2000 | Robb | G06T 19/003 382/128 |
| 7,369,229 | B2 * | 5/2008 | Bissett, III | G01J 1/4204 356/328 |
| 7,925,167 | B1 * | 4/2011 | Kozubal | H04B 10/118 398/125 |
| 8,072,581 | B1 * | 12/2011 | Breiholz | G01S 7/51 356/5.01 |
| 8,222,582 | B1 | 7/2012 | Anderson | |
| 9,702,702 | B1 * | 7/2017 | Lane | G01C 21/025 |
| 10,012,547 | B1 * | 7/2018 | Stone | G01S 3/7867 |
| 2005/0151965 | A1 * | 7/2005 | Bissett, III | G01J 1/4204 356/328 |
| 2005/0192719 | A1 * | 9/2005 | Sheikh | B64G 1/36 701/13 |
| 2006/0085129 | A1 * | 4/2006 | Belenkii | G01C 21/025 701/500 |
| 2006/0085130 | A1 * | 4/2006 | Belenkii | G01C 21/025 701/468 |
| 2006/0282217 | A1 * | 12/2006 | Twitchell | G01C 21/025 701/500 |
| 2011/0077863 | A1 | 3/2011 | Brace | |
| 2011/0275408 | A1 | 11/2011 | Kulik | |
| 2012/0172061 | A1 * | 7/2012 | Dods | H04M 1/72522 455/457 |
| 2018/0306930 | A1 * | 10/2018 | Laine | G01S 19/08 |
| 2019/0078894 | A1 * | 3/2019 | Waldron | H04N 5/225 |

OTHER PUBLICATIONS

Jun. 22, 2017 Written Opinion issued in International Patent Application No. PCT/EP2017/056169.

Sep. 8, 2016 Search Report issued in British Patent Application No. GB1604556.9.

Bangert J.A.; "Set Your Sights on STELLA: New Celestial Navigation Software from USNO;" CHIPS; vol. 14, No. 5; pp. 5-7; Apr. 1996.

Flink; "Star Identification by Optical Radiation Analysis;" IEEE Transactions on Aerospace and Navigational Electronics; Tech Paper; No. 3; pp. 212-221; Sep. 1, 1963.

Bessell; "Standard Photometric Systems;" Annual Review of Astronomy and Astrophysics; pp. 293-336; 2005.

Noll et al.; "Skycorr: A general tool for spectroscopic sky substraction," Astronomy & Astrophysics; Manuscript No. nolletal2014a; pp. 1-17; May 16, 2014.

"MICA—Multiyear Interactive Computer Almanac;" [online] http://aa.usno.navy.mil/software/mica/micainfo/php; pp. 1-5, last modified on Aug. 10, 2017.

"HM Nautical Almanac Office: NavPac4;" [online] http://astro.ukho.gov.uk/nao/navpacfour/index.html; pp. 1-2, retrieved on Apr. 4, 2018.

* cited by examiner

CELESTIAL NAVIGATION SYSTEM

This invention relates to systems and methods for navigation, specifically where one or more celestial bodies, such as stars or planets, are visible.

Celestial navigation has been practiced for a very long time. For centuries, sailors have used the stars to help ascertain their position, using instruments such as sextants. More recently, other navigational systems have taken over. For decades ships have used Decca, Loran, and more recently, satellite navigation systems to provide a more convenient and generally more accurate solution. Global Navigation Satellite Systems (GNSS) in particular, such as the US Global Positioning System (GPS) and the Russian GLONASS system have become ubiquitous in providing positional information for ships, aircraft and land-based vehicles, to the extent that the older celestial techniques have largely disappeared. However, GNSS systems are vulnerable, to a greater or lesser degree to jamming (intentional or accidental), or other anti-access capabilities. It is thus beneficial to have backup systems in case of failure of GNSS. In general, Decca and Loran used a (generally) land-based network of transmitters to provide navigation signals, but these are now of either very limited coverage or are no longer functional, and anyway would still be subject to jamming etc. For these reasons at least, increasing interest is being shown once more in celestial systems as a backup navigation system.

Patent documents US2011/0077863, U.S. Pat. Nos. 3,100, 264, 8,222,582 and 4,621,329 disclose various methods of navigating using celestial objects.

One constant problem with celestial navigation is its dependence on the weather. During complete cloud cover no celestial objects can be seen. Partial cloud cover may permit a few objects to be seen, but then there is the problem of identifying what those objects are. The sight of just a couple of stars, for example, can be hard to align on a star chart, and so be hard to identify. If several stars are visible, then a pattern may be recognised, matched to a star chart, and then used to identify the stars and provide a navigational fix in the usual way (i.e. using look-up tables or almanacs indicating the angular position, or altitude, of a given celestial body at a given time). If only very few, such as one or two stars are visible, then it becomes harder to identify them for navigational purposes, leading to potential uncertainty of position if they are used for navigation.

The aim of the present invention is to overcome at least one of the disadvantages of the prior art.

According to a first aspect of the present invention there is provided a method of navigating using at least one celestial object, comprising the steps of:

a) directing an optical device at a celestial object to receive electromagnetic radiation therefrom;

b) diffracting or refracting the electromagnetic radiation to obtain a spectrum of the celestial object;

c) measuring the intensity or relative flux of the spectrum at a resolution high enough to capture absorption and/or emission line data across a broad range of wavelengths;

d) identifying the celestial object by comparing, through pattern matching, the absorption and/or emission line data of step (c) with spectra contained in a reference database of celestial objects;

e) measuring the angle of elevation of the object along with the time at which the spectrum was observed;

f) using the information obtained in steps d) and e), along with a pre-compiled table of celestial body positions, to calculate a geographical position of the optical device;

The method may use some or all of the standard 58 navigational stars, but may use, as well or instead of one or more of these, other celestial objects as well. Preferentially it includes stars that have distinct spectral characteristics enabling more effective comparison.

The method according to the invention therefore allows a navigational fix (i.e. the determination of a position, or a reduced area of uncertainty on the ground or sea etc.) based upon the detection and identification of a single celestial object. This increases the usability of celestial navigation, particularly in partly cloudy conditions when only one or two celestial bodies may be visible. In such conditions, traditional celestial navigation is very difficult, or even sometimes impossible, due to the uncertainty of identifying what may be the only object visible. Prior art systems use a plurality of stars and commonly, the patterns these stars make with each other to identify individual stars and establish a celestial frame of reference to derive a positional fix. Observation of the discrete absorption and/or emission features in the spectra, as described herein, allows at least some individual celestial objects to be identified without reference to the objects around them, using a database containing the spectra of the pre-selected celestial objects in the sky. The position of these celestial objects in the sky is measured with reference to the telescope pointing direction, including altitude, and preferably azimuth also, and the time of the observation recorded using a clock. This information is sufficient for a positional fix to be derived, typically from an almanac or from celestial navigation software such as MICA—Multiyear Interactive Computer Almanac available from http://aa.usno.navy.mil, or the United Kingdom's Hydrographic Office (UKHO) NavPac Software which provides simple and efficient methods for calculating the positions of celestial bodies.

Advantageously, some embodiments may also comprise the step of measuring an azimuth bearing of the celestial object (or advantageously its geocentric true azimuth). Without knowledge of the celestial object's azimuth, which is the horizontal direction of the celestial body with respect to a reference such as geographic north, it is only possible to derive a circle of position i.e. the observer's position is somewhere on a circle on the Earth's surface. This is described in more detail below. An azimuth reading e.g. derived from a compass bearing, or an understanding of the observer's approximate position on the surface of the earth, can be used to reduce the navigational uncertainty to an approximate location on the circle. Thus, observation (of the elevation and azimuth) and identification of a single celestial object, along with the time of the observation allow a geographical position to be found, as compared to the observation of multiple celestial objects of the prior art.

Advantageously, some embodiments may derive the azimuth of the celestial object by using an inertial navigation system, or using any other suitable means.

It will be appreciated by those of ordinary skill in the art that, although appropriate embodiments of the invention do allow a navigational fix to be obtained with reference to a single observation of a single celestial object, it would be advantageous to make multiple observations, either repeat observations of the same celestial object or preferably of other celestial objects well separated in the sky. The increased number of observations may in general be used to improve the accuracy over that of a single observation, by means of averaging the position or by triangulation (after taking account of any movement based upon different measurement times).

As stated above, the traditional approach used by automatic celestial navigation systems is to recognise patterns of stars in the sky in order to establish where the observer or detector is on the surface of the Earth.

Embodiments of the invention instead looks for patterns in the light of individual celestial objects themselves to establish their identity and thereby, using a process as described herein, to arrive at a position on the surface of the earth. These patterns in the light from the celestial bodies are primarily as a result of absorption and/or emission lines produced by the atmospheres of these bodies. These lines interrupt the typical black body continuum emitted by a radiative object such as a star. The structure of these lines (depth and width) and their presence or absence can vary depending on the physical and chemical characteristics of the star. They therefore can provide a unique celestial fingerprint for the star in question and enable reliable identification, particularly if supported by other characteristics such as luminosity and colour. It has been found that the cooler stars, designated as K and M-type stars are particularly suitable for this. This is because their cooler atmospheres support complex chemistries that cause many absorption (and/or emission) lines to be observed in their spectra, particularly in the wavelength band between approximately 4500 to 9000 Angstroms, or in one or more sub-bands in this range. It will be appreciated that where there are more absorption and/or emission characteristics in such a body, then unique identification of the body using a pattern matching algorithm is more straightforward.

The optical device may advantageously be a telescope, or camera with a telephoto lens, or other functionally similar instrument.

The optical device may conveniently have a catadioptric lens arrangement, so as to achieve high magnification with a compact design. The optical device may be, for example, a Schmidt-Cassegrain telescope or similar lens or mirror arrangement. Alternatively, a refracting optical device may be used.

Conveniently, the optical device may be mounted on a mount, such as (preferably) an altazimuth mount, or alternatively an equatorial mount, where the mount is arranged to indicate or record the direction in which the optical device is pointing.

The optical device advantageously has a sensor, such as a charge-coupled device (CCD) optical sensor, or a complementary metal-oxide semiconductor (CMOS) optical sensor, that is able to record and measure light impinging upon it.

The sensor should have a resolution high enough to capture the spectral information relating to the absorption/emission detail, as explained herein.

Conveniently, the sensor may be used as a component in the analysis of the light to ascertain a spectrum thereof. Advantageously, a diffraction grating may be employed in the optical device, to disperse the light from the optical device so as to produce a spectrum. Together, the diffraction grating and the sensor may comprise a spectrometer, wherein light from different wavelengths is projected across different regions, and hence pixels, of the sensor. Alternatively, other forms of spectrometer, such as a refractive (e.g. prism) spectrometer, may be used.

Advantageously, a slit may be incorporated in the light path of the optical device, such as at the entrance to the diffraction grating. Use of a slit allows a section of the light of the celestial object to be isolated and hence provides improved spectral purity when atmospheric conditions are sub-optimal. Use of a slit also aids sky subtraction.

The spectrometer is used to produce a spectrum of the incoming light.

Advantageously, the spectrum obtained may be examined to identify structural elements including its absorption and/or emission lines and may further include other features introduced, for example by the Doppler broadening of any lines, or structure due to close-binary companions. Luminosity and/or colour information (using colour index) may also be used to further differentiate celestial objects. The spectrum, along with optionally the luminosity and/or colour information provides a dataset, or "fingerprint" of the celestial object that aids its identification in a reference database. The dataset can be correlated, or pattern-matched, with spectra from known objects in a reference database.

Preferably the reference database comprises a plurality of prior measurements for each star, with the measurements covering a range of different conditions, such as different times of day, different cloud levels, different environmental conditions etc. There may be, for example, tens, or many tens of measurements for each star. This information is advantageously then used to model the typical response and variation thereof of the spectrum of each star in the database, for example the mean and standard deviation of the relative flux at each wavelength.

The spectrum should be measured with a resolution allowing the absorption and/or emission lines to feature in the spectral data. The resolution is advantageously at least 10 angstroms and is more preferably at least 7, 5 or 3 angstroms. It will be appreciated that the finer the measurement resolution, the more accurate the subsequent pattern matching will be with reference data.

To a good approximation celestial bodies, such as stars, radiate as if they are blackbodies and thus, when analysed, their spectra show a typical blackbody curve function, or Planck curve where in Cartesian co-ordinates, the y-axis represents the intensity or relative flux and the x-axis represents wavelength. This curve rises steeply at shorter wavelengths to peak, before gradually falling away at longer wavelengths. The function is extremely sensitive to temperature and cooler celestial bodies show curve functions that peak at longer wavelengths than their hotter counterparts. It is advantageous that the spectral measurements cover the majority of this curve function for all the celestial bodies of interest. As explained earlier, the preference is to use the cooler K and M-type stars and so the measurements should adequately cover where the intensity/relative flux peaks for such stars. Preferentially, the spectrum should cover the region between 4500 and 9000 Angstroms, but some embodiments may extend beyond this, and others may have a reduced coverage, for example, if celestial bodies other than stars are used. Note that the terms "intensity" and "relative flux" are used herein synonymously Once the spectral band of interest has been sampled in sufficient detail, then pattern matching may be performed thereon. In some instance a straightforward correlation between the measured spectrum and the spectra within the reference database may be performed, and the nearest match selected as the identified star (or other celestial body). However, in preferred embodiments, the obtained image data corresponding to the spectrum is processed to improve the discrimination between individual celestial bodies. Such processing may include:

i) spatial filtering to remove very fine scale detail, corresponding to sensor noise, and very coarse scale detail to reduce variations in black point from the sensor and also reduce the effect of the gross sensitivity response curve of the sensor and the effect of some atmospheric variations. This can be achieved using a linear convolution filter with bandpass characteristics that removes very high and low spatial frequencies such as a Difference of Gaussians filter.

ii) spectral filtering using a reference image of a region of the sky near to the celestial body in question, or by making observations of a plurality of celestial objects, and, given hypotheses of possible confounding effects such as atmospheric absorption or sky radiance, deriving common factors affecting observations, and removing the effects of such common factors from the image;

iii) Normalisation of the filtered spectrum;

iv) optionally applying further filters to emphasise particular spectral features, such as computing the gradient of the spectrum (i.e. the rate of change of intensity with respect to wavelength), and performing subsequent processing on the spectrum gradient;

The processed signal may then be compared against reference spectra (where the reference spectra have been similarly processed). Advantageously, this is done using a statistical approach, comparing each measured wavelength value with the corresponding wavelength values for each celestial body stored in the reference database. The mean and/or standard deviation values of each wavelength of each celestial body in the database may be used, to provide a likelihood that the given observation relates to that celestial body. The median and/or median absolute deviation may also be used. Other statistical techniques that assume correlation between measurements at different wavelengths (such as Principle Component Analysis) may also be used. The likelihoods (after being normalised across all the celestial bodies at that wavelength) may then be summed across all wavelengths, to give, for each celestial body in the reference database, an overall likelihood that the observation was of that body. That body having the largest likelihood value may then be taken as the observed celestial body. The likelihood value is advantageously subject to thresholding, so that if the likelihood value falls below the threshold, then it is assumed that the observed celestial body is not one that is in the database.

Other embodiments may use alternative methods for carrying out the pattern matching of the observed spectra with the spectra in the reference database. Such techniques may include using multiple models or observations for celestial objects, such as a k-Nearest-Neighbour classifier, a neural network, or Support Vector Machine classifiers, or linear discriminant analysis.

In some embodiments of the invention, a correlation may be done between the processed spectrum of an observed celestial object and a similarly processed spectra in the reference database, and if a correlation above a predetermined threshold is not found, then other identifying features, such as the luminosity or colour index of the celestial body may then also be used as a further discriminant.

The reference database of at least some of the brightest objects in the sky may be obtained from existing astronomical records, or may be produced in advance by the user of the invention. This database then acts as a record that may be used to compare or correlate any current observations with, so as to positively identify them. The reference database may advantageously include the brighter K and/or M-type stars that exhibit a multiplicity of absorption and/or emission lines due to the nature of their chemistries and would therefore be of most use for pattern matching purposes.

Advantageously, the reference database comprises of celestial objects spaced throughout the sky, in both the northern and southern hemispheres. This therefore provides a reference that may be used from any location on the earth.

Advantageously, some embodiments may provide a working database that comprises a subset of the celestial objects in the reference database. The subset may be selected based upon current knowledge of the location of the user and the time in the year. If the user has some knowledge of their location, then the subset may comprise of those celestial objects expected to be potentially visible from that location (which may include an error region around the location to account for uncertainty of location). This provides the benefit that the working database can include celestial objects that are spectrally similar to other objects that are within the reference database, but which haven't been selected for inclusion in the working database. This increases the number of celestial objects that may be unambiguously identified in the region covered by the working database. The subset may, in some embodiments, be arranged to contain those celestial objects within a sub region that is within 90° of the expected location of the user (including the error region around the expected location). Other embodiments may choose different sizes of sub region. The sub region may be varied in size according to the certainty of position and look-direction of the optical device. The sub region may also be selected, when used in daylight or twilight conditions, based upon the position of the sun. For example, the celestial objects that are within a predetermined angle, such as approximately 30°, 45°, 60°, 75° or 90°, from the sun, where the scattering of light in the shorter wavelengths, such as the Blue (B) band (as defined in the Johnson-Cousins UBVRI system referenced below) may be high, may be excluded from the subset, so as to avoid excessive solar energy from entering the optical device and making identification of the celestial object harder.

The database may be further limited to recording those objects that have the most distinctive spectra, which will provide a greater surety of a correct identification. Conveniently, the database may comprise approximately of the brightest 20, 30, 40, or 50, 57, 70, 100 or 130 objects that meet the above criteria, although clearly some embodiments may have a database having a different number. The database may advantageously include the 58 special status stars (as are well known to those skilled in celestial navigation) that are often tabulated in almanacs, and may further include a selection of other bright stars that have distinguishing features in their spectra.

Accordingly, embodiments of the invention may be arranged wherein the step of identifying the celestial objects is done by cross-correlating, or otherwise comparing, the received spectrum with reference spectra previously taken from known celestial objects, and selecting the reference spectrum having a correlation above a predetermined threshold.

Advantageously, embodiments of the invention may be arranged to determine, using a sensor, the luminosity and colour (determined as a colour index) of the celestial object to provide further information that may be used to uniquely identify the object. This may be done using the Johnson-Cousins UBVRI (as described in Bessel M. S.: Standard Photometric Systems, Annu. Rev. Astron. Astrophys. 2005 43.) standard photometric system, where luminosity at a pre-selected passband may be determined following normal astronomical photometric procedures, including the subtraction of bias and sky backgrounds. In addition colour index, such as, V-R or R-I may also be used to further aid identification, where V, R and I are bands broadly within the visible, red, and infrared bands, as explained in more detail in the above reference.

The accuracy of the positional fix obtained is dependent upon the clock accuracy, and upon the positional accuracy of the telescope. The clock may conveniently be a clock that uses GNSS signals or a broadcast standard, such as DCF77 in Germany or MSF in the UK to ascertain the time, depending on availability. Advantageously, the clock may be a self-contained clock, such as a rubidium or caesium atomic clock that does not require ongoing or intermittent reference to an external source. Alternatively, the clock may be a fundamentally less accurate clock, such as a quartz clock, that is advantageously corrected by intermittent connection to an accurate time source.

Preferably, a clock accurate (at the time a positional measurement is made) to within 10 ms of UTC, or some other known time reference, is used, although it will be appreciated that less accurate clocks may be used, but may impact upon the accuracy of the navigational fix obtained.

Although the invention may have most efficacy at night, or in twilight conditions, it may also have some efficacy in daytime conditions. It is not widely appreciated that some stars or planets are detectable in daylight, and even in some circumstances when there is very light cloud cover. The invention therefore has utility in daylight conditions under these circumstances.

When making observations of a celestial object then advantageously UBVRI pass-band filters may be used within the optical device. In daylight, preference may be given to the R and I pass-bands so as to avoid shorter wavelengths where effects such as Rayleigh Scattering reduce transmittance. The use of filters is particularly advantageous when using colour (colour index) as a contributory means of identification.

Advantageously, if observations are being made in daylight, or in twilight conditions where there is still an appreciable amount of daylight, then a sub-set of the referenced celestial objects may be used, where the sub-set includes those objects that have more distinctive features towards or in the red or near infrared (IR) region of their spectra (represented by the R and I passbands of the UBVRI Johnson-Cousins photometric system) where the atmospheric transmittance is slightly better.

Advantageously therefore, the measured spectrum obtained in step c) (mentioned earlier) may be filtered or corrected to remove or decrease contributions from sources other than the celestial object being observed, or to address regions in the electromagnetic spectrum where atmospheric transmission is poor. Such sources could include sunlight (including moonlight), air glow emission lines and light pollution. Advantageously, in some embodiments sky background may be subtracted, and, if desired, software techniques applied, such as Skycorr (Noll S. et al.: Skycorr: A general tool for spectroscopic sky subtraction, Astronomy & Astrophysics manuscript no. Noll et. Al. 2014, May 16, 2014), to mitigate the effects of airglow emission lines.

Although the invention provides a means for determining a position using a single celestial object, a person of ordinary skill in the art will appreciate that improved accuracy, or improved confidence in any position obtained, may be achieved by making multiple fixes, from different objects, or even from the same object. The positional results from multiple fixes may be combined, e.g. by averaging, to produce a positional fix with improved accuracy.

According to a second aspect of the invention there is provided a celestial navigation system comprising:

an optical device; for receiving light from a celestial object;
 a means for measuring a pointing direction of the optical device;
 a spectrometer for measuring spectral properties of light at an output of the optical device,
 a clock for measuring the time; and
 a processor for recording inputs from the clock, the spectrometer and the means for measuring the direction in which the optical device is pointing,
 wherein the processor is arranged to compare through pattern matching a spectrum created by the spectrometer of an object observed by the optical device with reference spectra of celestial objects within a reference database, and upon finding a match, using a precompiled table of celestial body positions, along with a recorded time of observation and information relating to the telescope direction at the time of observation to compute a navigational positional fix for the optical device.

Precompiled tables of celestial body positions, typically in the form of almanacs that allow a positional fix to be computed, given the information gathered with this invention, are commonly available. For example, printed almanacs are available, such as Brown's Nautical Almanac, published by Brown, Son and Ferguson Ltd. Almanacs in software form are also available, such as the NavPac, from HM Nautical Almanac Office in the UK.

The direction of the optical device may conveniently use a celestial reference frame, such as the equatorial co-ordinate system of Right Ascension and Declination, or any other suitable reference frame.

Advantageously, the invention may also be used alongside other celestial navigation techniques, such as the more traditional pattern recognition techniques, when multiple celestial objects are visible. For example, if three stars are visible, then traditional pattern recognition only has the separation distance between them to identify the stars. Such information may, on its own, lead to an ambiguity wherein multiple pairs of two stars are similarly spaced. By applying the principles of the invention to identify one or more of the visible objects, a greater confidence in the identity, and hence any subsequent navigational fix, can be achieved.

Embodiments of the invention will now be described in more detail, by way of example only, with reference to the following Figures, of which:

FIG. 1 diagrammatically illustrates an embodiment of the invention;

Figure 4:
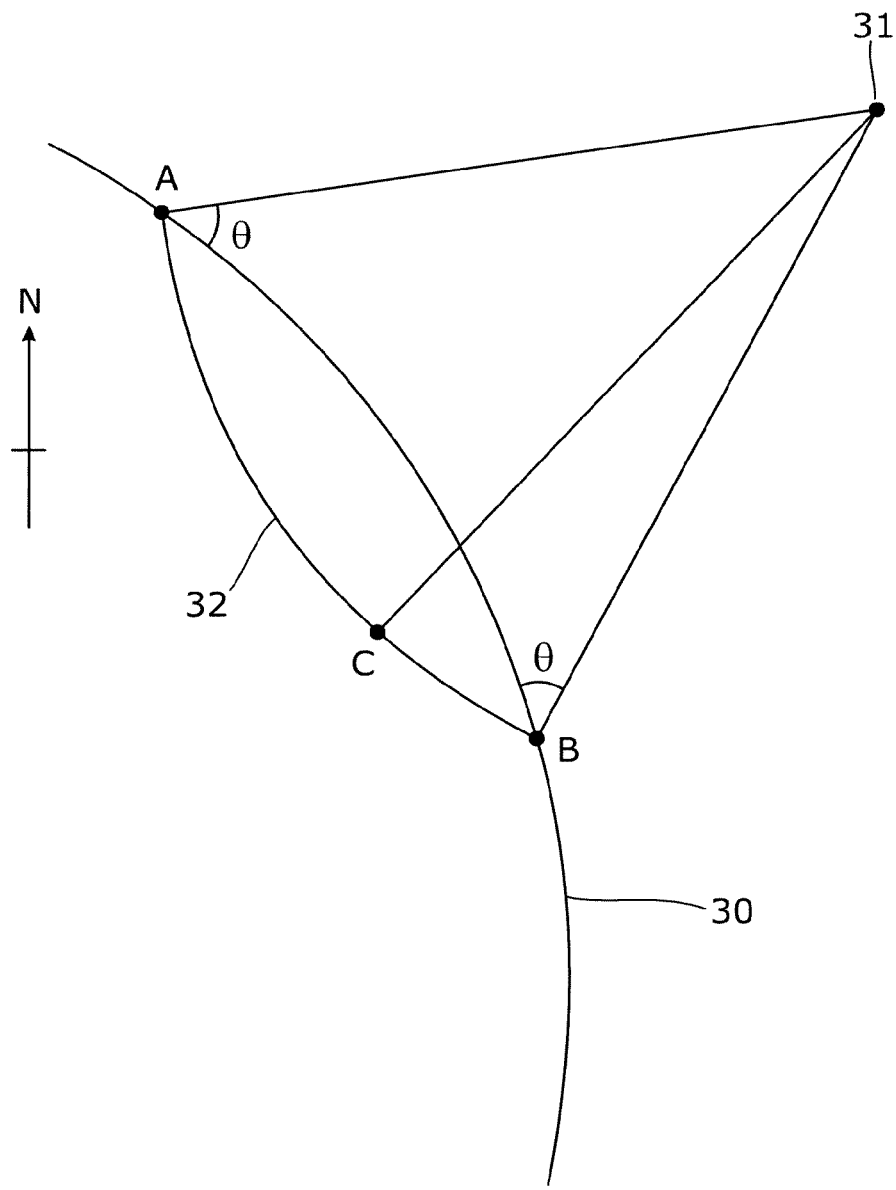

FIG. 4 diagrammatically illustrates how a single, known star can provide a navigational fix; and FIG. 5 shows a further embodiment of the invention incorporating an All-sky camera.

Figure 1:
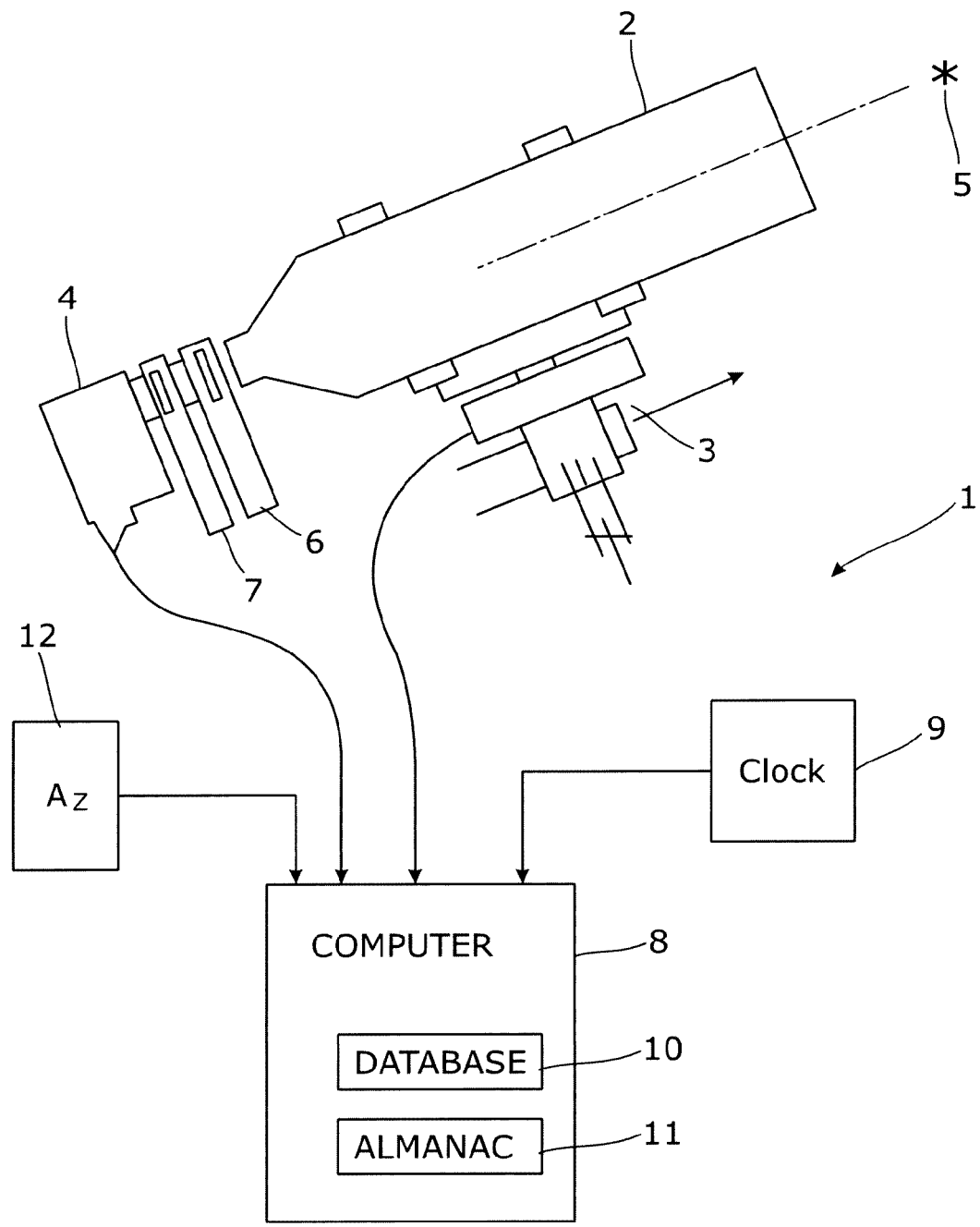

With reference to FIG. 1, a first embodiment of the invention shows a navigational system 1 comprising a telescope 2 mounted on an equatorial mount 3. The mount is able to measure and store the position in which the telescope 2 is pointing at any given time. Within the focal plane of the telescope is mounted a CCD sensor 4, that is arranged to receive and detect light travelling down the telescope from distant objects such as a star 5.

A pair of filter wheels 6, 7, allow for a diffraction grating and one or more filters, such as pass-band filters, to be positioned in the path of incoming light before it is incident on the sensor 4. Filter wheel 6 allows the inclusion of a Red (R) filter and/or Infrared (I) filter, that may be used for daylight observations as atmospheric transmission is slightly better towards longer wavelengths, e.g. towards the R and I pass-bands of the Johnson-Cousins UBVRI system. Filter 7 allows the inclusion of a diffraction grating that splits the light into its component wavelengths before the light is captured by the CCD 4. Use of the diffraction grating therefore allows a relatively straightforward analysis of the spectrum of the star 5 (or other celestial body) to take place.

Other embodiments may use a slit to mask some of the background noise and enable better sky subtraction, particularly for daytime or twilight use. An embodiment that uses a slit has the slit located at a focal plane of the optical device. The slit may also augment the diffraction process.

Referring to the embodiment of FIG. 1 once more, the CCD provides a digital output signal to a computer 8, comprising a processor and storage. Within the storage is a database 10 of the spectra of some of brightest objects in the night sky, (including the 58 special status navigational stars).

A reference clock 9, that determines the time from a radio time code signal such as the German DCF77 or the British MSF signal, or from a similar time signal, is also connected to the computer, and is able to supply the time to the computer on demand. A device 12 for measuring the azimuth at which the telescope is pointing, which may comprise a compass or inertial navigation system, also provides an input to the computer 8.

The diffraction acts to split the incoming light into its various spectral components, and to present this spectrum on the CCD. The computer 8 is arranged to accept image information from the CCD, and to process it using image processing software in a known manner to obtain the spectrum from which it is possible to obtain relative flux data over a range of wavelengths. At the same time, it obtains a time reference from the clock 9, and positional information from the mount 3, comprising information indicating the direction in which the telescope is pointing. It then compares the spectrum to the database, to find a best match, using pattern matching software. In making the comparison, it limits its search based upon any a priori knowledge of the geographical position of the telescope, effectively creating a subset of the reference data. The embodiment may customise the limit based upon the expected accuracy of the a priori knowledge. A basic limit is to limit the database comparison to those celestial objects that lie within 90° of the expected position at the time the observation was made. Finer limits, that reduce this angle, may be imposed if greater confidence in the current geographical position, and also in the telescope pointing direction is had.

The pattern matching performed by the computer 8 is based upon comparison of spectral signatures of one or more observed stars against a database of previously acquired measurements. The spectral signature is obtained from observed spectra by applying filtering to remove both low and high spatial frequency information (reducing the influence of sensor noise, sensor spectral response and variation in sensor black point), followed by normalisation and, optionally (but is done in this example), computing the gradient of spectrum to give increased emphasis to distinct spectral features. Importantly, the pattern matching takes account of both the typical spectral response and variations thereof. The variation information is used when comparing spectra so that the most informative wavelengths have more influence when making comparisons.

Filters used to extract spectral signatures for pattern matching may be optimised given a set of reference observations, e.g. to maximise the likelihood of correctly identifying the correct star. The filters (and parameters thereof) may advantageously be changed dynamically for different known operating scenarios (e.g. searching for particular stars or operation in different ambient light levels).

The output as a result of a pattern match in the database will be, given a suitably clear observation of an object that sits within the database 10, a positive identification of the object. The computer therefore now has positional information from the mount, along with time information at which a known celestial body was at the recorded position, this information comprising basic navigational information.

The computer has commonly available almanac software 11 within its storage that, given the basic navigational information, provides a navigational position, or fix, on the Earth at which the telescope was located at the observation time. The accuracy of the fix is dependent upon the accuracy of the basic navigational information collected, as with previous methods of celestial navigation.

Figure 2A:
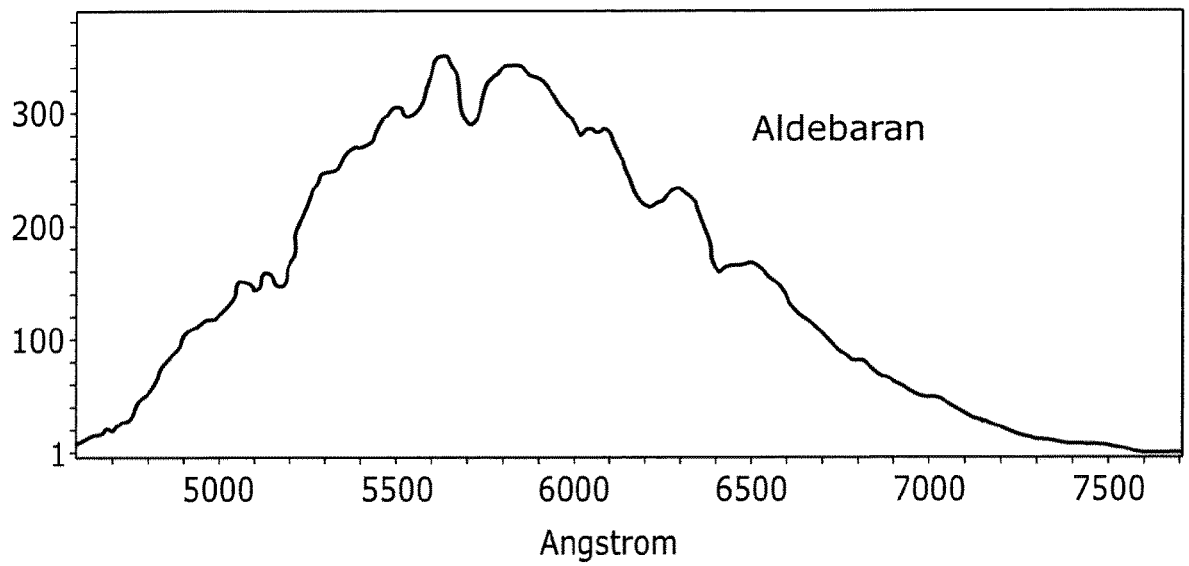
FIG. 2 shows graphical representations of two spectra from two celestial objects.
Figure 2B:
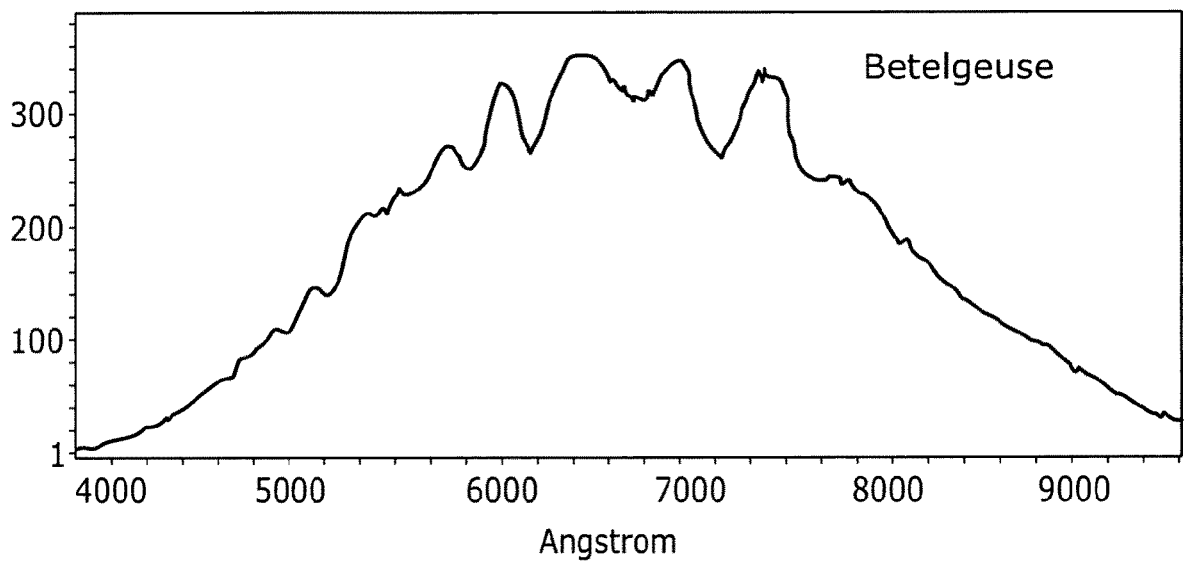

FIG. 2 shows 2D Cartesian plots of spectra obtained using a system as described in relation to FIG. 1. The spectra were obtained at night. FIG. 2a shows the spectrum of Aldebaran, the $16^{th}$ brightest star, which is found in the constellation of Taurus. FIG. 2b shows the spectrum of Betelgeuse, the $9^{th}$ brightest star, located in Orion. The vertical scale is in arbitrary units of relative flux. Note the different horizontal axes. Clear differences between the spectra can be seen—not only in the horizontal position of the bulk of the energy, but also in the detail of the peaks. This is caused by the differing physical characteristics of the stars e.g. chemical composition and temperature making up the outer layers of the stars. The differing characteristics create different absorption bands within the spectra.

The spectra were measured with a relatively low cost diffraction grating. Other embodiments may use an improved diffraction grating, that provides a greater resolution of the spectrum, so providing more distinguishing features of each star, and hence making identification simpler. Other embodiments may also use a slit, e.g. as described above, to reduce noise and enable better sky subtraction.

These differences in the spectra shown enable image processing and/or pattern matching software running on a processor in an embodiment of the invention to distinguish between the two spectra, when comparing a measured spectrum with one in its referenced database. Similarly, the spectra of many other stars also have unique features that enable them to be distinguished by the pattern matching software.

Figure 3:
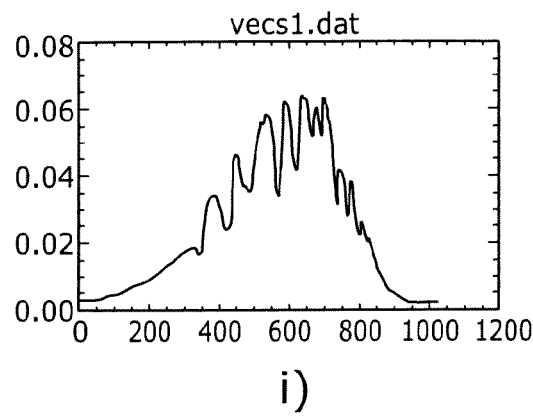
FIG. 3 shows graphical representations of three further spectra, and the result of processing the spectra for subsequent pattern matching.
Figure 3:
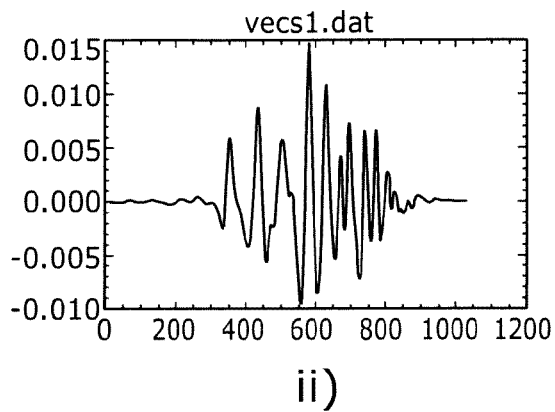
Figure 3:
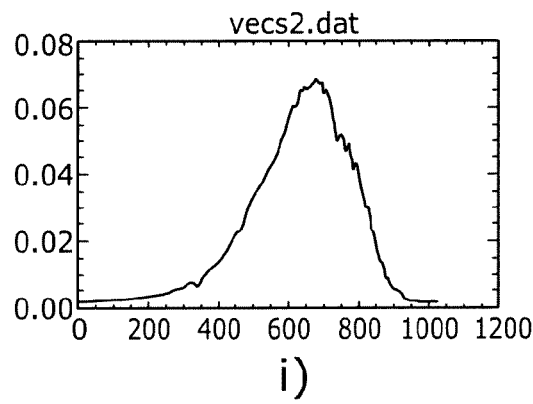
Figure 3:
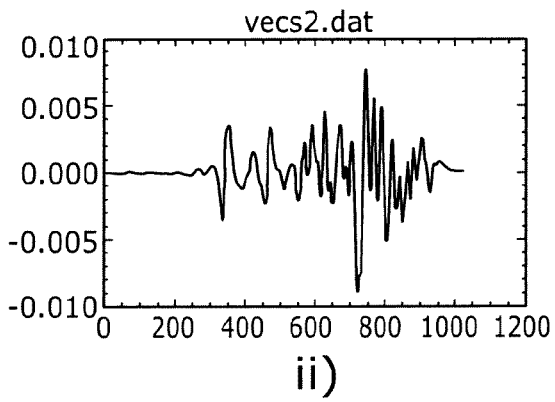
Figure 3:
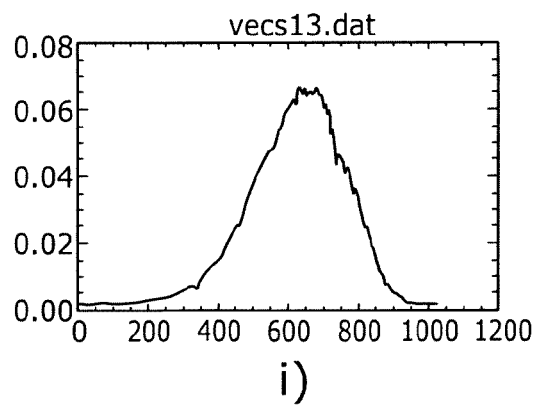
Figure 3:
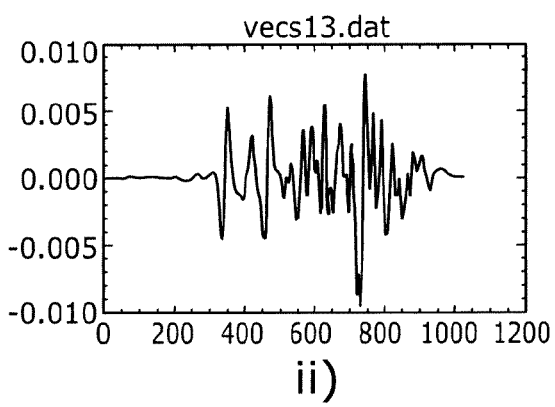

FIG. 3 shows 2D Cartesian plots of spectra from three different stars, along with the plot obtained from processing each spectrum according to the methods described herein. At FIG. 3a (i), the spectra of the star Sheat is shown. It will be seen that this plot of its spectrum exhibits distinctive characteristics due to absorption lines. The processed spectrum is shown at FIG. 3a(ii). The processing carried out was:

a) spatial filtering to remove very fine scale detail likely caused by sensor noise, and very coarse scale detail likely caused by variations in a black-point of the sensor;

b) normalisation of the spectrum amplitude in line with the reference database amplitudes;

c) computing the gradient of the spectrum

The processed signal in FIG. 3a(ii) is then compared, as described herein, to similarly processed reference spectra in the reference database.

FIGS. 3b and 3c show spectra (at (i)), and the results of the processing above (at (ii)) for the stars Shedar and Pollux respectively. It will be noticed that the spectra of FIGS. 3b(i) and 3c(i) are very similar, and it would be very difficult to distinguish these by eye. However, when the spectra are processed as described above, differences start to emerge. See for example the waveform corresponding to the horizontal axis at the point marked x. The amplitudes at that point differ more significantly, making the subsequent pattern matching process more likely to identify the correct star.

FIG. 4 shows how a single, known celestial object can be used to provide a navigational fix, that, given also azimuthal information, such as a compass bearing of the direction of the celestial object (and the time of measurement, as is usually done), can provide a unique position, within the bounds of measurement error. A part of the Earth 30 is shown, along with a celestial object, such as a star 31. An observer on the Earth located at point A will observe the star 31 at an elevation angle Θ, and at a compass bearing of due south. This elevation angle, coupled with the time of observation, can provide a navigational fix that is some (as yet unknown) point on the circle 32, using a standard nautical almanac. It will be noticed that the star will appear at the same elevation angle Θ at every point on the circle 32 and hence an elevation angle alone will be insufficient to derive a position, other than the knowledge that the observer is somewhere on the circle. Thus, an observer at point B will see the star 31 at a similar elevation angle Θ, but with a compass bearing of due north. Similarly, an observer at C will see the star at the same elevation angle, but with a compass bearing broadly north east. Azimuthal information, such as derived from an inertial navigation system, or compass bearing can be used to locate the observer on the circle, and so provide a unique fix.

The current invention provides the means for identifying many of the stars, without reference to any other star (e.g. using a more traditional star pattern for identification purposes), and so therefore allows the technique described in relation to FIG. 4 to provide the navigational fix should just one of the stars be visible.

Figure 5A:
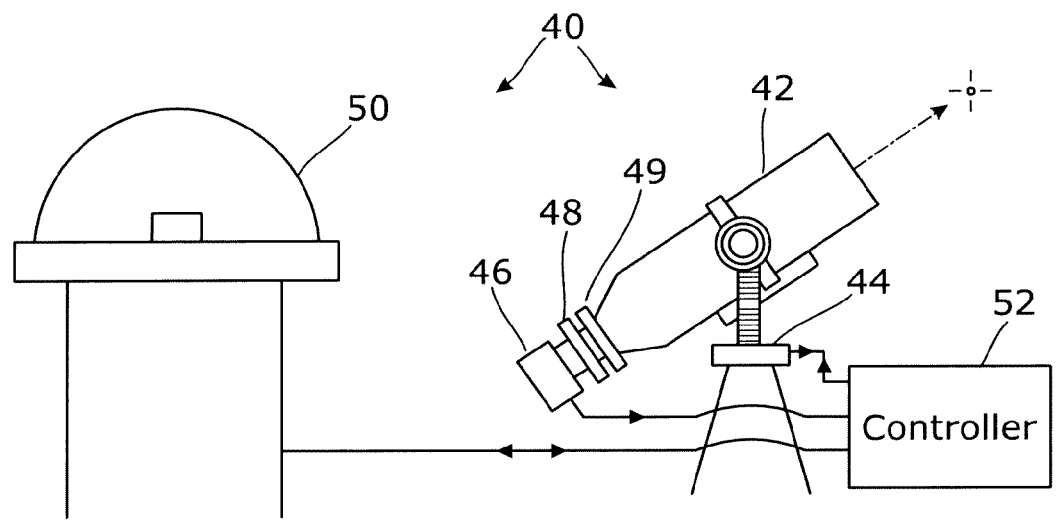

FIG. 5a shows a further embodiment of the invention. A system 40 comprises a telescope 42 mounted on an altazimuth motorised mount 44. The telescope has a CCD sensor 46, and a diffraction grating 48 for producing a spectral output on the CCD of light entering the telescope, and a filter 49 for daylight observations, whereby shorter wavelengths such as blue light are excluded from entering the diffraction grating. Note that this filter may be varied according to e.g. the time of day in which observations are being made, or local the atmospheric conditions, so as to reduce undesirable wavelengths from being processed. An All-sky camera 50 (such as an Occulus All-Sky Camera available from www.sxccd.com) is arranged to have a wide-angle view of the whole sky, or a significant portion thereof. The telescope CCD 46, the mount 48, and the All-sky camera 50 are all connected to a control unit 52, which may comprise of a general purpose computer, or a specialised computer arranged to process the information from its inputs, and to control the mount so as to direct the telescope 42 to point to a desired region of the sky. The positions of the telescope and the All-sky camera are calibrated, such that the control unit is able to direct the telescope mount to point the telescope to a given point, as determined from an image provided by the All-sky camera.

Figures 5B, 5C:
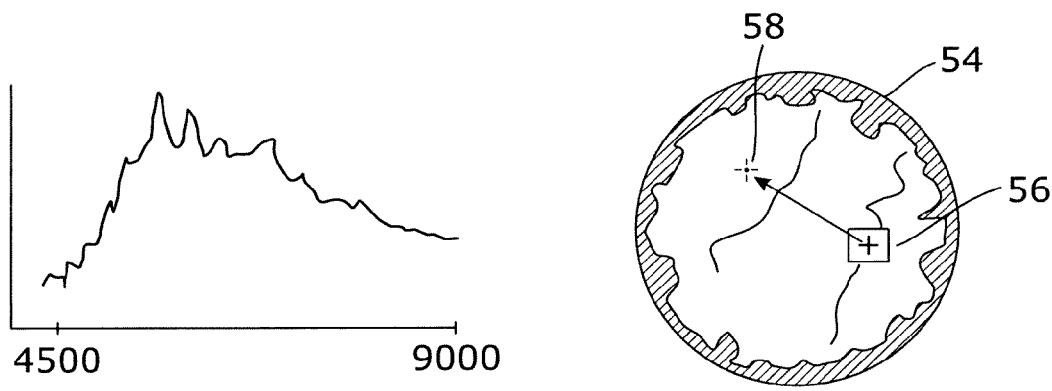

In operation, the All-sky-camera 50 provides sky images to the control unit 52. The control unit examines the images, and identifies one or more bright point, which may be celestial objects pertinent to navigation. A chosen point is selected, and the position in the sky determined, from the positional calibration carried out earlier. The control unit then directs the telescope to point to the chosen object with appropriate signals being sent to the mount 44, and when it has done so, the image from the CCD sensor is captured. This image comprises of a spectral response, which when extracted and plotted in 2D Cartesian format is as shown in FIG. 5b. The spectral data is then processed and analysed, again as described previously, by comparing it to similarly processed reference data of celestial objects stored in the control unit. A match above a given threshold provides an identification of the object, and its positional information, as determined by the telescope is used as previously described to produce a full or partial navigational fix.

The process in the above paragraph may be repeated to provide a plurality of points for analysis; e.g. the sky camera may be arranged to supply images to the controller at intervals, such as every few seconds, and the telescope directed to the next point to produce a spectrum, and an identification of the point attempted as before. FIG. 5c shows an image 54 as may be provided by the sky camera 50 to the controller 52. The controller has, in this case already directed the telescope 42 to point to object 56, and the spectrum from that image has been processed. This image however also reveals (due e.g. to movements in clouds 56 etc.) a new bright object 58. The controller may then instruct the telescope mount to slew the telescope to point to the newly revealed object 58, to obtain a new spectrum therefrom. In this way, the system can continuously seek and attempt to identify objects, to produce navigational information which may be combined with previously obtained data to improve the accuracy of the navigational fix.

The system may be arranged, when activated, to work in the manner described above to generate a navigational fix that may be interrogated as desired by other systems. The navigational fix may be provided, along with an estimate of its accuracy, based upon factors such as the number of stars used in generating the fix, the positional accuracy of the azimuth and elevation data, and the timing accuracy of the measurements obtained.

It will be appreciated that the invention may be used on its own, to provide a navigational fix, or may be used in conjunction with other navigational systems, to provide an alternative, or a backup solution. When used with other navigational systems, it will be appreciated that the results from embodiments of the invention may advantageously be fused or otherwise combined with the results from the other systems. It will also be appreciated that the celestial object may be a star, or may be a planet, although it is likely that it will predominantly be used with stars.

The system may be used in any suitable configuration, and various modifications or combinations of elements of the various embodiments described may be carried out without departing from the scope of the invention, as would be understood by a normally skilled person.

The invention claimed is:

1. A method of navigating on the surface of the Earth using at least one celestial object by calculating a geographical position, the method comprising the steps of:
   a) directing an optical device at a celestial object to receive electromagnetic radiation therefrom;
   b) diffracting or refracting the electromagnetic radiation to obtain a spectrum of the celestial object, the spectrum of the celestial object being filtered or corrected to remove, decrease, or otherwise compensate for effects of radiation that did not emanate from the celestial object;

c) measuring an intensity or a relative flux of the spectrum at a resolution high enough to capture absorption and/or emission line data across a broad range of wavelengths;

d) identifying the celestial object by comparing, through pattern matching, the absorption and/or emission line data of step (c) with spectra contained in a reference database of celestial objects;

e) measuring an angle of elevation and an azimuth of the celestial object along with a time at which the spectrum was observed; and f) using the information obtained in steps d) and e), along with a pre-compiled table of celestial body positions, to calculate a geographical position of the optical device, wherein the filtering or the correction uses a spectrum calibration measurement taken from a region where the electromagnetic radiation (i) is a result of terrestrial sources, (ii) is a result of the chemical composition of the Earth's atmosphere, and/or (iii) is radiation that originates from the Sun.

2. A method as claimed in claim 1 wherein the reference database comprises, for each celestial body, a plurality of measurements thereof taken in different environmental conditions, to provide statistical information, to be used in the pattern matching process.

3. A method as claimed in claim 1 wherein at least one of:
a luminosity and a pre-selected colour index of the celestial object is also used as a distinguishing criterion in identifying the celestial object.

4. A method as claimed in claim 1 wherein the optical device is a camera lens or telescope.

5. A method as claimed in claim 1 wherein the reference database comprises of celestial objects that have measurably different spectral features from other such celestial objects in their neighbourhood, and wherein the reference database contains celestial objects chosen from at least the brightest 20, 30, 40, 50, 58, 70, 100 or 130 celestial objects.

6. A method as claimed in claim 5 wherein the celestial objects in the reference database comprise of K and M type stars.

7. A method as claimed in claim 1 wherein the diffraction of the electromagnetic radiation to obtain a spectrum thereof is performed using a diffraction grating and a multi-pixel optical sensor such as a digital camera sensor.

8. A method as claimed in claim 7 wherein the spectrum obtained is examined to identify structural elements including at least the absorption and/or emission lines of the spectrum.

9. A method as claimed in claim 8 wherein the spectrum is processed prior to being compared to reference data, said processing comprising the steps of:
a) spatially filtering the spectrum to remove first spatial detail corresponding to sensor noise, and second spatial detail corresponding to effects of a gross sensitivity response curve of the sensor and variations in black-point across the sensor, the first spatial detail being finer than the second spatial detail;
b) normalisation of the filtered spectrum to provide increased consistency across different observations.

10. A method as claimed in claim 9 wherein the prior processing further comprises the step of producing a gradient signal indicating a change in intensity with a wavelength of the spectrum, and conducting subsequent processing using the gradient signal.

11. A method as claimed in claim 9 wherein the step of identifying the celestial object is done by cross-correlating the spectrum or the processed spectrum with reference spectra previously taken from known celestial objects, and selecting a reference spectrum having a correlation above a predetermined threshold.

12. A method as claimed in claim 11, wherein
the step of identifying the celestial object is done by pattern matching the observed, processed spectrum with similarly processed reference spectra stored within the reference database.

13. A method as claimed in claim 12 wherein the pattern matching comprises matching the processed spectrum against statistical representations of the known celestial objects stored in the reference database, to find a maximum likelihood observation.

14. A celestial navigation system for calculating a geographic position on the surface of the Earth, the celestial navigation system comprising:
an optical device for receiving light from a celestial object;
a means for measuring a pointing direction of the optical device;
a spectrometer for measuring spectral properties of light at an output of the optical device;
a clock for measuring a time; and
a processor for recording inputs from the clock, the spectrometer and the means for measuring the pointing direction of the optical device;
wherein the processor is arranged to compare, through pattern matching, a spectrum created by the spectrometer of the celestial object observed by the optical device with reference spectra of celestial objects within a reference database, and upon finding a match, using a precompiled table of celestial body positions, along with a recorded time of observation and information relating to the optical device pointing direction, including an angle of elevation and an azimuth at the time of observation to compute a navigational positional fix for the optical device, wherein
the spectrum is filtered or corrected to remove, decrease, or otherwise compensate for effects of radiation that did not emanate from the celestial object, and
the filtering or the correction uses a spectrum calibration measurement taken from a region where the electromagnetic radiation (i) is a result of terrestrial sources, (ii) is a result of the chemical composition of the Earth's atmosphere, and/or (iii) is radiation that originates from the Sun.

15. A celestial navigation system as claimed in claim 14 wherein the spectrometer comprises a diffraction grating and a light sensitive element.

16. A celestial navigation system as claimed in claim 14 wherein the optical device further comprises a filter, for removing or reducing at least one of:
stray solar light, and blue light.

17. A celestial navigation system as claimed in claim 14 wherein the processor is arranged to remove, decrease or otherwise compensate for effects of radiation that has not emanated from the celestial object.

18. A method of navigating on the surface of the Earth using at least one celestial object by calculating a geographical position, the method comprising the steps of:
a) directing an optical device at a celestial object to receive electromagnetic radiation therefrom;
b) diffracting or refracting the electromagnetic radiation to obtain a spectrum of the celestial object, and processing the spectrum by:
i) spatially filtering the spectrum to remove first spatial detail corresponding to sensor noise, and second spatial detail corresponding to effects of a gross sensitivity response curve of the sensor and variations in black-point across the sensor, the first spatial detail being finer than the second spatial detail; and ii) normalization of the filtered spectrum to provide increased consistency across different observations;

c) measuring an intensity or a relative flux of the spectrum at a resolution high enough to capture absorption and/or emission line data across a broad range of wavelengths;

d) identifying the celestial object by comparing, through pattern matching and cross-correlating the processed spectrum, the absorption and/or emission line data of step (c) with similarly processed spectra contained in a reference database of celestial objects, and selecting a reference spectrum having a correlation above a predetermined threshold, e) measuring an angle of elevation and an azimuth of the celestial object along with a time at which the spectrum was observed; and f) using the information obtained in steps d) and e), along with a pre-compiled table of celestial body positions, to calculate a geographical position of the optical device, wherein the pattern matching comprises matching the processed spectrum against statistical representations of the celestial objects stored in the reference database, to find a maximum likelihood observation.

* * * * *